UNITED STATES PATENT OFFICE.

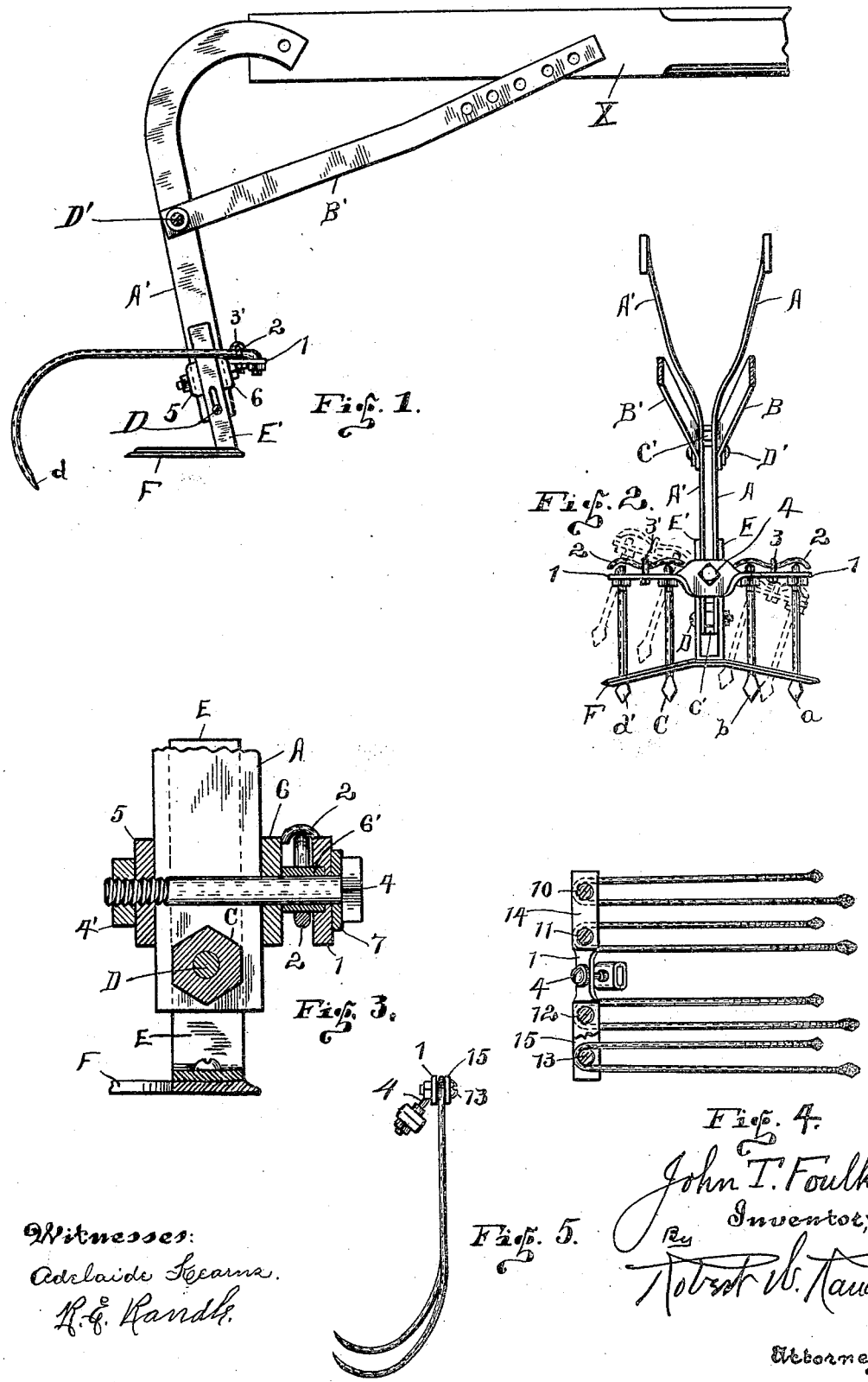

JOHN T. FOULKE, OF RICHMOND, INDIANA.

SWIVEL-ACTION CULTIVATOR ATTACHMENT.

957,322.  Specification of Letters Patent.  Patented May 10, 1910.

Application filed June 7, 1909. Serial No. 500,536.

*To all whom it may concern:*

Be it known that I, JOHN T. FOULKE, a citizen of the United States, residing in Richmond, in the county of Wayne and State of Indiana, have made certain new and useful Improvements in Swivel-Action Cultivator Attachments, of which the following is a full, clear, and accurate specification.

My invention relates to cultivator plows, and more particularly to the means for swivelly connecting the attachments to the plow standard.

My object is to provide a swivel action cultivator attachment of simple and inexpensive construction, which will be neat and attractive in appearance, strong and durable in construction, and which will give a maximum of efficiency in actual use.

Other specific objects and particular advantages will be brought out in the course of the following description, and that which is new and useful will be correlated in the appended claims.

One manner for carrying out the objects of my invention in a practical manner, and that which in practice I have found to be the most practical, is shown in the accompanying drawings, in which—

Figure 1 is a side elevation of my invention in operative position in connection with a plow. Fig. 2 is a front elevation of the same. Fig. 3 is a vertical central section taken through the invention. Fig. 4 is a top or plan view of a slightly modified form of attachment. And Fig. 5 is a side elevation of the construction shown in Fig. 4.

Similar indices denote like parts throughout the several views.

In order that my invention may be more fully understood I will take up a detail description thereof, in which I will set forth the invention as comprehensively as I may.

The letters A and A' denote the plow standard, whose upper end is to be attached to the plow beam X in any well known manner, and retained in their proper inclination by the braces B and B'. Said members A and A' are identical with each other, their upper portions being flared outward, with their main portions located parallel with but separated from each other, as shown in Fig. 2, being spaced apart by means of the nuts or washers C and C', and secured in position by the bolts D and D', which bolts pass through the respective nuts or washers C and C'. The rear ends of braces B and B' are also secured by the bolt D' as shown. Located in contact with the outer faces of the lower portions of the members A and A', parallel therewith and extending therebelow, are the vertically adjustable arms E and E', which have longitudinal slots formed therethrough for the bolt D, by which they are secured and made adjustable vertically with relation to the members A and A' of the standard, substantially as shown.

The letter F denotes a horizontal cutter blade secured to the lower ends of the arms E and E', and extending out at right-angles thereto.

I now come to the description of the more essential features of my invention, which comprises the swivelly mounted agitator, in which: numeral 1 denotes a plate having its central portion twisted at substantially right-angles to the two outer main portions, with a central aperture formed therethrough, for the purpose hereinafter set forth. Through each of the flat or end portions of the plate 1 are formed two apertures for the front ends of the teeth or tines $a$, $b$, $c$ and $d'$, whose upper threaded ends extend downward through said apertures and are secured each by a nut, as indicated in Fig. 2. Said tines are bent sharply back at substantially right-angles and lie flat across the top of the plate 1 and then continue on rearward for some distance where they are curved downward and then slightly forward, with their free ends pointed and flattened whereby they will pierce the soil as the cultivator is carried thereover. Said tines are retained in position (in addition to the said nuts attached thereto) by the spring-bar 2, which extends across the base portions of each of said teeth and longitudinally of the plate 1, with its central portion curved down parallel with the central portion of the plate 1, for the purpose hereinafter set forth. An aperture is formed, through the plate 1, between each two of the said tines for the hooks 3 and 3', which hooks engage the bar 2 and are adapted to be tightened by means of nuts threaded on the stems of said hooks and engaging against the under face of the plate 1 as indicated in the drawings. Said plate 1 is swivelly mounted to the standard as follows: Numeral 4 denotes a bolt, having a nut 4' threaded on its rear end. Numeral 5 denotes a clip disposed across the rear edges of the members A and A', and extending slightly around on the sides thereof to near the arms E and E'. A central aperture is formed through the clip 5 for the bolt 4. Numeral 6 denotes a clip, similar to said clip 5, which is disposed across the front edges of the members A and A' and which also extends around on the sides of said members to near the arms E and E', and with a central aperture formed therethrough for the bolt 4. Loosely mounted around the bolt 4, and contacting with the face of the clip 6, is the thimble 6'. The forward end of said thimble is secured in said central aperture of the plate 1. The head of said bolt 4 contacts with the forward face of the central portion of the plate 1, and said bolt extends back through said thimble, and the clips 6 and 5, its threaded portion extending out beyond the latter to receive the nut 4″ which binds said parts together, but allowing the plate 1 to turn thereon, as indicated in Fig. 2. The head of said bolt may be separated from the face of the plate 1 by the washer 7.

A slight modification of the above is shown in Figs. 4 and 5, in which the teeth or tines are formed double, and the points of each alternate tooth or tine is located forward of its companion. Each pair of teeth or tines being formed of an integral length of material, doubled near the central portion forming a loop which passes around one of the bolts 10, 11, 12 and 13, and rests on the plate 1. Each two pairs of said teeth are adapted to be clamped to the plate 1 by means of the two short-plates 14 and 15, said short-plate being secured to the plate 1 by bolts as shown, which holds the teeth or tines securely in position. The swivel connection of the attachment shown in Figs. 4 and 5 with the standard is substantially the same as that shown in Figs. 1, 2 and 3.

Having now fully shown and described my invention, what I claim and desire to secure by Letters Patent of the United States, is—

1. A swivel action cultivator attachment comprising a standard composed of duplicate parallel parts having its members spaced apart, oppositely disposed clips engaging the standard in front and rear, a bolt passing through said clips and between the members of the standard, a thimble surrounding the bolt and contacting with the forward clip, a plate secured to said thimble and adapted to rotate about said bolt, and a plurality of tines carried by said plate, all substantially as shown and described.

2. A swivel action cultivator attachment, comprising in combination with a standard having members spaced apart, a pair of oppositely disposed clips engaging the front and the rear edges of the standard, a bolt disposed through said clips and passing between the members of the standard, a thimble loosely surrounding the bolt and contacting with the forward clip, a plate having its central portion turned at an angle with reference to the end portions thereof and having an aperture through the center thereof in which is secured the forward end of said thimble.

3. A swivel action cultivator attachment, comprising in combination with a standard, a cultivator attachment pivoted in its center to the lower portion of the standard, said attachment comprising a plate having its central portion twisted at an angle with reference to the end portions thereof, a plurality of tines carried by said plate, and means for removably securing the tines in operative position, substantially as set forth.

JOHN T. FOULKE.

Witnesses:
ROBERT W. RANDLE,
R. E. RANDLE.